United States Patent

Buij et al.

[11] Patent Number: 5,982,108
[45] Date of Patent: Nov. 9, 1999

[54] DC/AC CONVERTER FOR A DISCHARGE LAMP HAVING A DC OFFSET AT THE SWITCHING ELEMENT TO REDUCE POWER LOSS

[75] Inventors: Arnold W. Buij; Ronny A. A. M. Jacobs, both of Eindhoven, Netherlands

[73] Assignee: U.S. Philips Corporation, New York, N.Y.

[21] Appl. No.: 08/882,445

[22] Filed: Jun. 25, 1997

[30] Foreign Application Priority Data

Aug. 14, 1996 [EP] European Pat. Off. .............. 96202285

[51] Int. Cl.$^6$ ..................................... H05B 37/02
[52] U.S. Cl. ..................... 315/209 R; 315/219; 315/244; 315/DIG. 7; 363/132
[58] Field of Search ............................... 315/219, 209 R, 315/244, DIG. 7; 363/132

[56] References Cited

U.S. PATENT DOCUMENTS 5,087,862 2/1992 Mita et al. ............................... 315/289
5,332,951 7/1994 Turner et al. ........................ 315/209 R

OTHER PUBLICATIONS

Holt "Electronic Circuits Digital and Analog" 1978 pp. 454–455.

*Primary Examiner*—Robert Pascal
*Assistant Examiner*—Michael Shingleton
*Attorney, Agent, or Firm*—Edward Blocker; Bernard Franzblau

[57] ABSTRACT

A circuit arrangement including a DC/AC converter for operating a discharge lamp. The DC/AC converter includes input terminals for connection of the DC/AC converter to a DC voltage source, and a switching circuit connected to the input terminals and provided with at least one switching element. The switching element has a control electrode and a main electrode and a control circuit between the main electrode and the control electrode for generating a control signal for the switching element. The switching element is conductive when a voltage is present between the control electrode and the main electrode with a first polarity having a value which exceeds a threshold value. A load branch includes at least inductive means and output terminals for connection of the discharge lamp, which load branch is supplied via the switching circuit. The control circuit also generates a DC voltage component between the control electrode and the main electrode with a polarity which is opposed to the first polarity. The switching element has fast switching capability including short duty cycles.

9 Claims, 6 Drawing Sheets

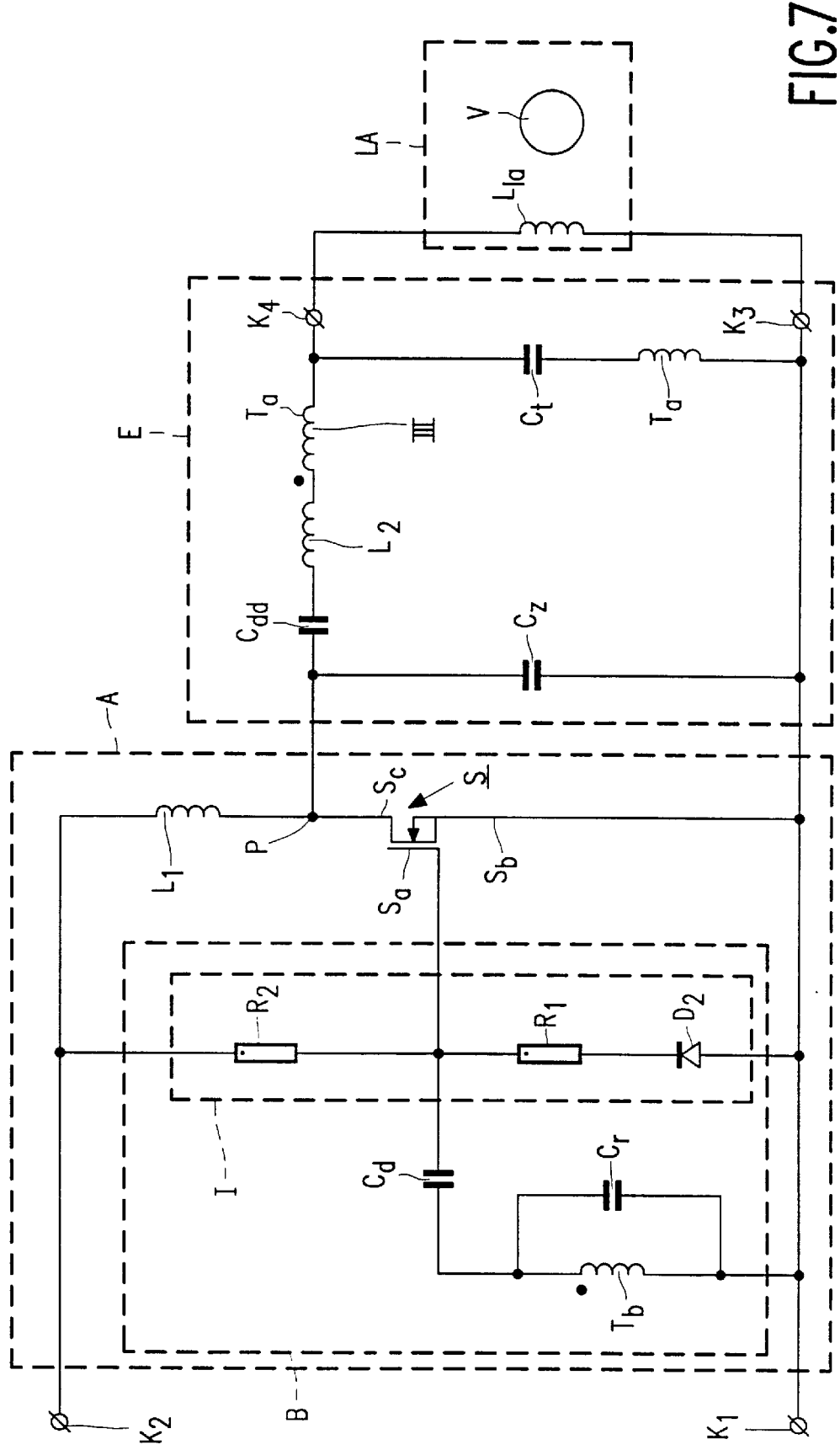

DC/AC CONVERTER FOR A DISCHARGE LAMP HAVING A DC OFFSET AT THE SWITCHING ELEMENT TO REDUCE POWER LOSS

BACKGROUND OF THE INVENTION

The invention relates to a circuit arrangement comprising a DC/AC converter for operating a discharge lamp, which DC/AC converter is provided with:

input terminals for connection of the DC/AC converter to a DC voltage source, a switching circuit connected to the input terminals and provided with at least one switching element, which switching element has a control electrode and a main electrode, which switching element has a control circuit between the main electrode and the control electrode with a series arrangement of means for generating a control signal for the switching element and of first decoupling capacitive means, and which switching element is conductive when a voltage is present between the control electrode and the main electrode with a first polarity and with a value which exceeds a threshold value, a load branch comprising at least inductive means and output terminals for connection of the discharge lamp, which load branch is supplied via the switching circuit.

Such a circuit arrangement is known from U.S. Pat. No. 4,748,383. The switching circuit A in the known circuit arrangement comprises a further switching element in series with the switching element mentioned above, and a primary winding of a transformer is included in the load branch. Means for generating a control signal are formed by a secondary winding of the transformer. The switching element is periodically switched alternately into a conducting and a non-conducting state by means of the control signal. As long as the voltage between the control electrode and the main electrode of the switching element has a value which differs little from the threshold value, however, the switching element is in a transitional state in which high losses occur in the switching element. It is accordingly desirable that passing of the threshold value, and thus switching between the conducting and the non-conducting state, should take place as quickly as possible. It is also desirable, to reduce the switching losses, that the duty cycle, i.e. the time fraction in which the switching element is in the conducting state, should be comparatively short, for example 30%. An increase in the amplitude of the control signal does cause a quicker passage of the threshold value, but it also causes the duty cycle to increase.

SUMMARY OF THE INVENTION

It is an object of the invention to provide a circuit arrangement of the kind described in the opening paragraph in which the switching element is capable of fast switching, while nevertheless the duty cycle of the switching element can be comparatively short.

According to the invention, the circuit arrangement of the kind described in the opening paragraph is for this purpose characterized in that the control circuit comprises means for generating a DC voltage component between the control electrode and the main electrode with a polarity which is opposed to the first polarity. These means are also referred to below as means for generating a DC voltage component.

The presence of the DC voltage component renders it possible to increase the amplitude of the control signal without the duty cycle increasing. The higher amplitude causes a quicker passage of the threshold value, so that the switching element switches more quickly.

The DC/AC converter of the circuit arrangement according to the invention may be constructed in various ways. For example, the DC/AC converter is a full bridge circuit in which the switching element together with a further switching element forms a series circuit between the input terminals, an additional switching element and a further additional switching element being included between the input terminals for forming an additional switching circuit, while the load branch has a first end at a common junction point of the switching element and the further switching element and has a second end at a common junction point of the additional switching element and the further additional switching element.

Alternatively, the DC/AC converter may be a half bridge circuit, which comprises a single switching circuit, while the load branch is provided with second decoupling capacitive means, and a second end of the load branch is connected to an input terminal. In a full half bridge circuit, the second decoupling capacitive means comprise a first decoupling capacitive impedance of which one side at the same time serves as the second end of the load branch, while the first and a second decoupling capacitive impedance form an additional series circuit between the input terminals. In an incomplete half bridge circuit, a second decoupling capacitive impedance is absent, and the first decoupling capacitive impedance may be accommodated in any location in the load branch.

It is possible for second decoupling capacitive means to be present in the load branch also in the case of a full bridge circuit so as to ensure that the net charge displacement through the load branch is equal to zero. This is important for metal vapor discharge lamps, such as low-pressure mercury discharge lamps, for preventing migration of metal in the lamp.

In yet another embodiment, the DC/AC converter of the circuit arrangement according to the invention is fitted with a single switching circuit in the form of a class E converter. Preference is given, however, to a DC/AC converter constructed as a half bridge circuit because switching elements having a comparatively low breakdown voltage can be used therein. A full bridge circuit also offers this advantage, but it has the disadvantage that many components are necessary. The switching elements in the circuit arrangement according to the invention are preferably constructed as FETs.

The means for generating the control signal are, for example, an external signal source. Alternatively, the DC/AC converter may be a self-oscillating circuit. A practical embodiment of this modification is characterized in that the DC/AC converter is provided with a transformer of which a primary winding is included in the load branch and of which a secondary winding forms means for generating a control signal for the switching element.

An attractive embodiment is characterized in that the means for generating a DC voltage comprise a series arrangement of a first breakdown element, a first unidirectional element, and a buffering capacitive element, which series arrangement shunts the means for generating a control signal, while the first breakdown element has a breakdown level in the conduction direction of the first unidirectional element, said means for generating a DC voltage in addition comprising a first voltage divider which shunts the buffering capacitive element and which has a first and a second resistive branch, while one of the resistive branches of the first voltage divider forms a series circuit together with the first breakdown element and the first unidirectional element, which series circuit shunts the first decoupling capacitive means. This embodiment has the advantage that the duty cycle of the switching element is substantially independent of the amplitude of the control signal.

An advantageous embodiment is characterized in that the means for generating a DC voltage comprise breakdown means which have a first breakdown level at the first polarity and a second breakdown level at the polarity opposed to the first, while the absolute value of the second breakdown level is higher than that of the first breakdown level, and the amplitude of the control signal is higher than the absolute value of the first breakdown level. This embodiment has the advantage that the means for generating a DC voltage can be realized with comparatively few components. The breakdown means may be formed, for example, by zener diodes which may at the same time serve for protecting the control electrode of the switching element against an excess voltage.

A favorable modification of the above embodiment is characterized in that the amplitude of the control signal is lower than half the sum of the absolute values of the breakdown levels. Losses in the breakdown means are negligibly small in that case.

It is noted that U.S. Pat. No. 5,341,068 discloses a circuit arrangement with a DC/AC converter having a switching circuit provided with switching elements wherein breakdown means are present between the control electrode and the main electrode of the switching elements for which it is true that the absolute value of the second breakdown level is higher than that of the first breakdown level. In this circuit arrangement, however, first decoupling capacitive means between the secondary winding of the transformer and the switching element are absent. It is only stated about the breakdown elements that they serve to protect the switching elements against excess voltage. The amplitude of the control signal is unknown.

A further embodiment of the circuit arrangement according to the invention is characterized in that the means for generating a DC voltage component comprise a series arrangement of a first resistive element and a second unidirectional element between the control electrode and the main electrode, which second unidirectional element is conducting for a voltage between the control electrode and the main electrode having the first polarity, while the means for generating a DC voltage component in addition comprise voltage-limiting means for limiting voltages between the control electrode and the main electrode having a polarity opposed to the first polarity.

The voltage-limiting means are formed, for example, by breakdown means. A favorable modification of this embodiment, however, is characterized in that the voltage-limiting means are formed by a branch comprising a second resistive element between the control electrode and the main electrode. This modification is of particular importance in cases where a high stability of the lamp current amplitude is desired.

It is favorable in this modification when the second resistive element extends between the control electrode and a conductor having a potential of the first polarity. The control circuit may then serve at the same time as a starting circuit for starting an oscillation when used in a circuit arrangement according to the invention provided with a class E converter.

Given a circuit arrangement according to the invention in which the DC/AC converter is constructed as a half bridge circuit, while the switching circuit has a further switching element with a control electrode and a main electrode in series with the switching element, and the further switching element also has a control circuit between its control electrode and its main electrode with a series arrangement of means for generating a control signal and first decoupling capacitive means, it is favorable when a control electrode of the further switching element is connected to a common junction point of a first and a second resistive branch of a second voltage divider which is connected to the input terminals. The second voltage divider here acts as a starter circuit. Preferably, the resistive branches of the second voltage divider have the same resistance value. It is achieved thereby that the further switching element switches with the same duty cycle as the switching element without additional means being required in the control circuit of the further switching element. It is favorable when the control circuit of the switching element is constructed as described above with reference to the class E converter in an embodiment of such a circuit arrangement designed for comparatively low frequencies, for example below 100 kHz.

Alternatively, a circuit arrangement according to the invention may be provided, for example, with a starter circuit as described in U.S. Pat. No. 4,415,838. The starter circuit described therein comprises inter alia a series arrangement of a resistor and a capacitor between the input terminals, and a bidirectional breakdown element between a control electrode of the switching element and a common junction point of the resistor and the capacitor.

BRIEF DESCRIPTION OF THE DRAWINGS

These and other aspects of the circuit arrangement according to the invention will be explained in more detail below with reference to the drawing, in which:

FIG. 7 shows a fifth embodiment.

DETAILED DESCRIPTION OF THE PREFERRED EMBODIMENTS

Figure 1:
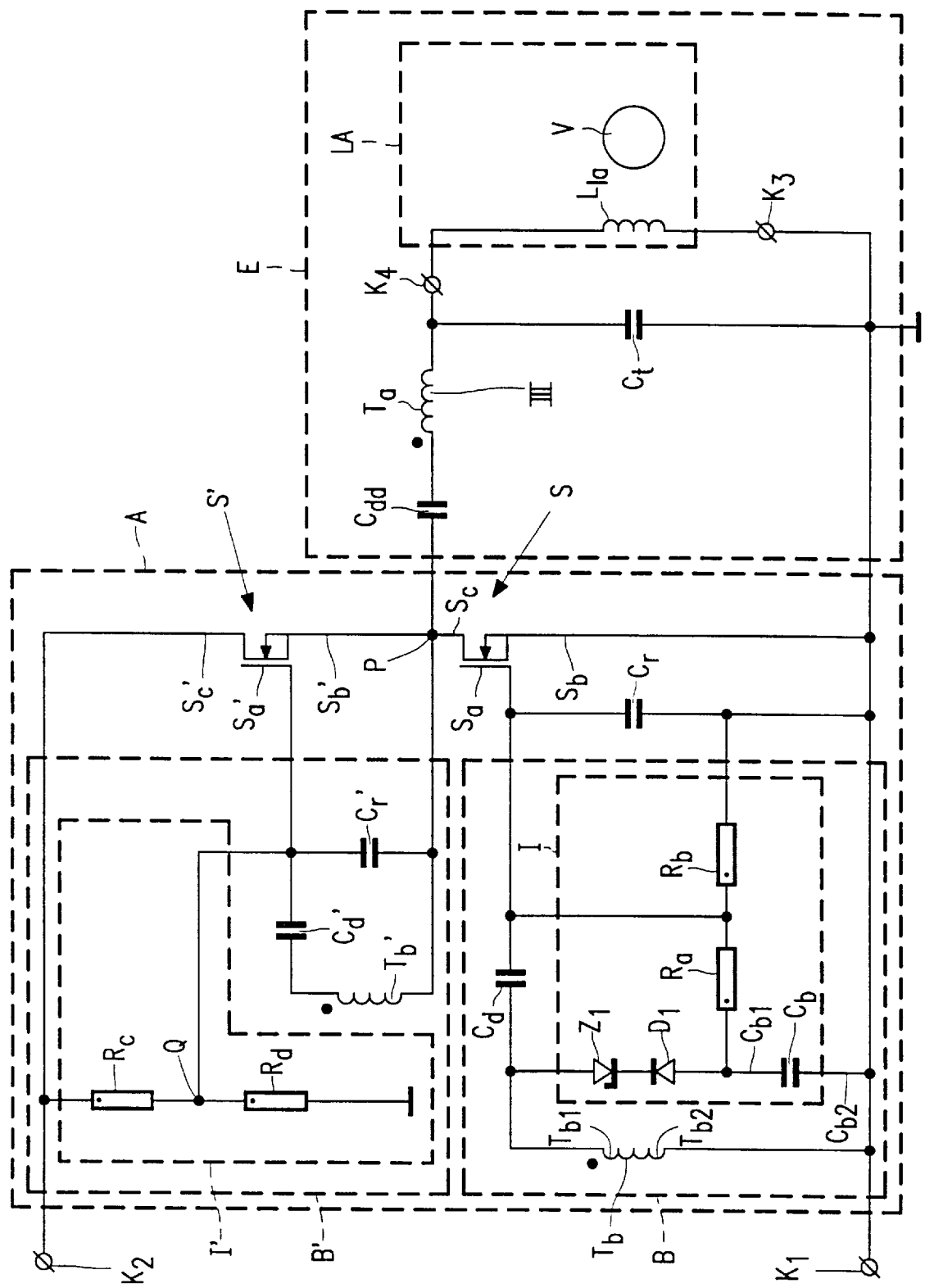
FIG. 1 shows a first embodiment of the circuit arrangement according to the invention, FIG. 2 plots the voltage (V) gradient between the control electrode and the main electrode of the switching element as a function of time (t)

The circuit arrangement shown in FIG. 1 and designed for operating a discharge lamp LA comprises a DC/AC converter provided with a first and a second input terminal K1, K2 for connection of the DC/AC converter to a DC voltage source. The DC/AC converter is in addition provided with a switching circuit A which has a switching element S with a control electrode Sa and a main electrode Sb and which is connected to the input terminals. The switching element S is connected by its main electrode Sb to the first input terminal K1. The switching circuit A has a further switching element S' of which a main electrode Sb' is connected to a further main electrode Sc of the switching element S. A further main electrode Sc' of the further switching element S' is connected to the second input terminal K2. The switching element S comprises between the main electrode Sb and the control electrode Sa a control circuit B with a series arrangement of means Tb for generating a control signal for the switching element and of first decoupling capacitive means Cd. The switching element S is conducting when a voltage of a first polarity and having a value exceeding a threshold value Vt is present between the control electrode Sa and the main electrode Sb.

The DC/AC converter is in addition provided with a load branch E which is supplied via the switching circuit A. A primary winding Ta of a transformer, which at the same time forms inductive means, is included in the load branch. The load branch in addition has output terminals K3, K4 for connection of the discharge lamp LA and second decoupling capacitive means Cdd. A coil Lla of an electrodeless lamp LA is connected to the output terminals K3, K4. During operation, the coil Lla generates a high-frequency magnetic field by means of which a discharge is maintained inside the discharge vessel V. The output terminals K3, K4 are shunted by a capacitive element Ct which forms a resonant circuit together with the coil Lla of the lamp, which promotes lamp ignition. The load branch is connected to a point P of the switching circuit A and to an input terminal K1. Means for generating the control signal of the switching element S are formed by a secondary winding Tb of the transformer. Capacitive means Cr form a resonant circuit together with the secondary winding Tb.

The control circuit B in addition comprises means I for generating a DC voltage component having a polarity opposed to the first polarity between the control electrode Sa and the main electrode Sb during nominal operation.

In the embodiment shown, the means I comprise a series arrangement of a first breakdown element Z1 formed by a zener diode, a first unidirectional element formed by a diode D1, and a buffering capacitive element formed by a capacitor Cb. The zener diode Z1 is connected by its anode to a first end Tb1 of the secondary winding Tb of the transformer. A cathode of zener diode Z1 is connected to a cathode of the diode D1, so that the zener diode has a breakdown voltage in the conduction direction of the diode. The anode of the diode D1 is connected to a first side Cb1 of the capacitor Cb. The second side Cb2 of the capacitor is connected to a second end Tb2 of the secondary winding of the transformer. The means I in addition comprise a first voltage divider which shunts the capacitor and which has a first and a second resistive branch Ra, Rb. The zener diode, the diode, and the first resistive branch Ra of the first voltage divider together form a series circuit which shunts the first decoupling capacitive means Cd.

The DC/AC converter of the circuit arrangement shown is constructed as a half bridge circuit in which the switching circuit A comprises a further switching element S' with a control electrode Sa' and a main electrode Sb' in series with the switching element S, which further switching element S' also has a control circuit B' between its control electrode Sa' and its main electrode Sb' with a series arrangement of means Tb' for generating a control signal and of first decoupling capacitive means Cd', said control electrode Sa' of the further switching element being connected to a common junction point Q of a first and a second resistive branch Rc, Rd of a second voltage divider which is connected to the input terminals K1, K2.

The operation is as follows. When a DC voltage is applied to the input terminals, a voltage difference will arise between the control electrode Sa' and the main electrode Sb' of the further switching element S', which is thus made to enter a conducting state. As a result, a current will flow through the primary winding Ta of the transformer into the load branch E. This current generates a voltage in the secondary windings Tb, Tb' of the transformer which brings the switching element S into a conducting state and the further switching element S' into a non-conducting state. This results in a reversal of the current direction in the primary winding Ta so that a voltage is induced in the secondary windings Tb, Tb' which again brings the switching element S into a non-conducting state and the further switching element S' into a conducting state. The cycle has thus been completed and will repeat itself periodically, so that the load branch E is supplied with an alternating current.

In each cycle, the series arrangement comprising the zener diode Z1, the diode D1, and the capacitor Cb starts conducting the moment the voltage at the first end Tb1 of the secondary winding Tb assumes a value relative to the second end Tb2 which is lower than the voltage at the first side Cb1 of the capacitor relative to the second side Cb2 augmented by the breakdown level of the zener diode Z1. The voltage across the capacitor Cb is thus a measure for the minimum value which the voltage across the secondary winding Tb of the transformer will assume during operation. A DC voltage component Vdc proportional thereto is generated across the first decoupling capacitive means Cd by means of the first voltage divider Ra, Rb. The voltage difference present between the control electrode Sa and the main electrode Sb is accordingly formed by a superimposition of the AC voltage induced into the secondary winding Tb and the DC voltage component Vdc generated by the means I.

Figure 2:
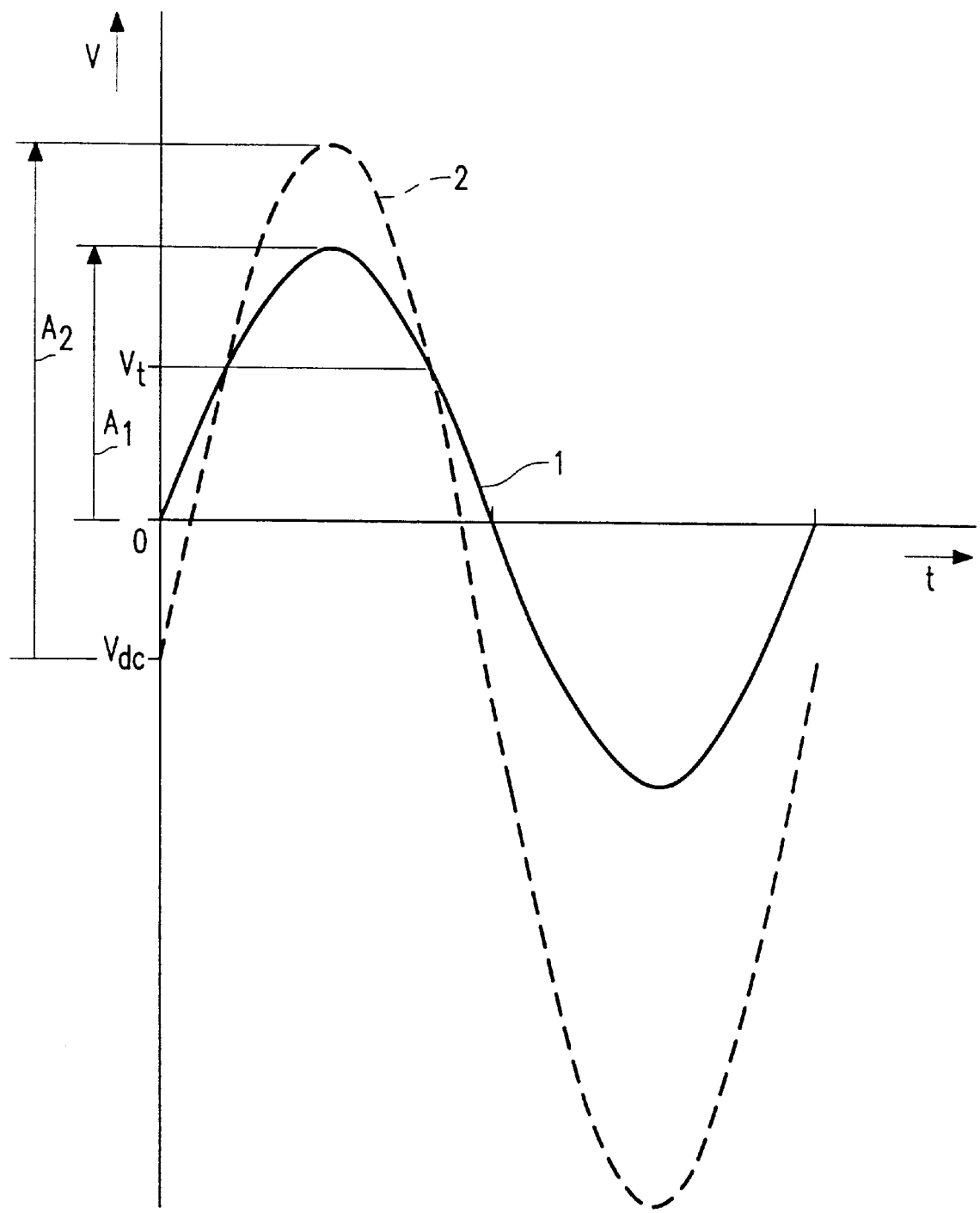

A continuous curve 1 in FIG. 2 represents the voltage difference gradient between the control electrode and the main electrode in the switching element of a circuit arrangement not according to the invention, where means I for generating a DC voltage component are absent. The amplitude $A_1$ of the control signal and the threshold value Vt of the switching element are chosen such that the switching element has a duty cycle of 30%. FIG. 2 also shows in a broken line the gradient 2 of the voltage difference in the circuit arrangement according to the invention. During operation of the circuit arrangement according to the invention, the voltage difference between the control electrode Sa and the main electrode Sb contains a DC voltage component Vdc with a polarity opposed to the first polarity. The threshold value Vt of the switching element and the amplitude $A_2$ of the control signal are again chosen here such that the duty cycle of the switching element is 30%. It is apparent from FIG. 2 that the voltage difference passes the threshold value Vt more quickly, given the same duty cycle, in the circuit arrangement according to the invention than in the circuit arrangement not according to the invention, so that the switching losses are smaller.

The average voltage at the control electrode Sa' of the further switching element S' is maintained at a predetermined value by means of the second voltage divider Rc, Rd. As a result, the duty cycle of the further switching element is set for a value which is coupled to the duty cycle of the switching element. An increase in the duty cycle of the further switching element compared with the preset value would also cause the average voltage at the point P to increase, and thus the average voltage difference between the control electrode and the main electrode of the further switching element to decrease. The increase in the duty cycle of the further switching element is counteracted thereby, so that the preset value of the duty cycle is maintained. If the resistive branches of the second voltage divider have the same resistance value, the duty cycles of the switching elements will also assume the same value.

Figure 3:
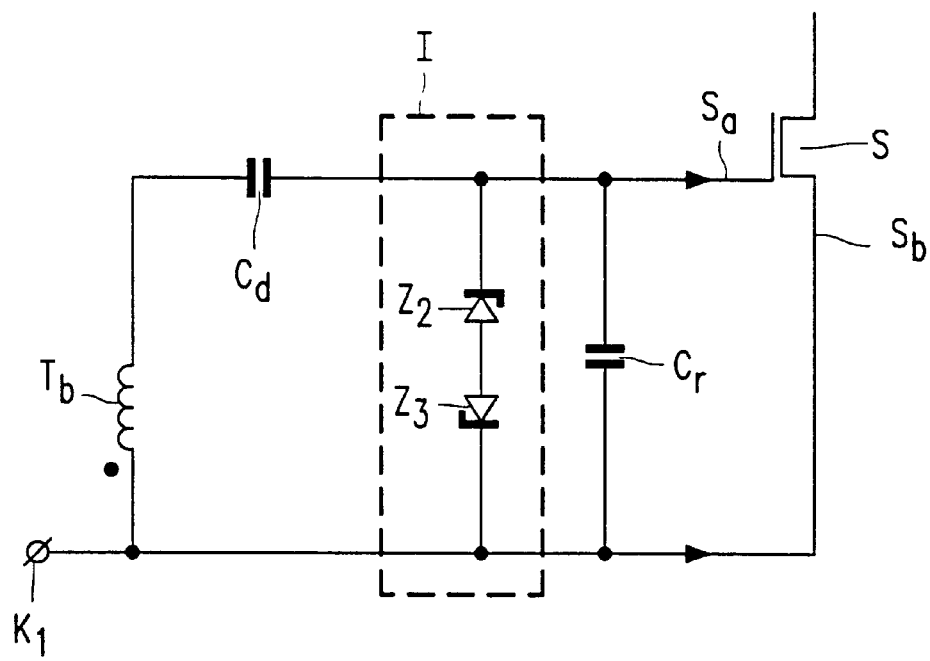
FIG. 3 shows a detail of a second embodiment.

A second embodiment of the circuit arrangement according to the invention is shown in FIG. 3. The means I in the embodiment shown comprise breakdown means, here constructed as zener diodes Z2 and Z3. Z2 has a first breakdown level $V_1$ of 6.2 V for the first polarity of the voltage. Z3 has a second breakdown level $V_2$ of an absolute value greater than that of the first breakdown level, in this case 18 V, at a polarity opposed to the first polarity. The control signal has an amplitude $A_2$ of 10 V, greater than the value of the first breakdown level. The amplitude $A_2$ of the control signal is smaller than half the sum (24.2 V) of the absolute values of the breakdown levels $V_1$, $V_2$. The means I operate as follows in the circuit arrangement as shown. The control signal generated in the secondary winding Tb reaches the breakdown means Z2, Z3 via the first decoupling capacitive means Cd. Since the amplitude $A_2$ of the control signal is greater than the value $V_1$ of the first breakdown level, the first zener diode Z2 is in a conducting state as long as the top value of the signal passed by the decoupling capacitive means Cd exceeds the first breakdown level $V_1$. A DC voltage component Vdc is built up thereby across the decoupling capacitive means Cd and is superimposed on the control signal. The breakdown level $V_1$ is no longer exceeded when the DC voltage component Vdc has assumed a value corresponding to the amplitude of the control signal minus the first breakdown level $V_1$.

Figure 4:
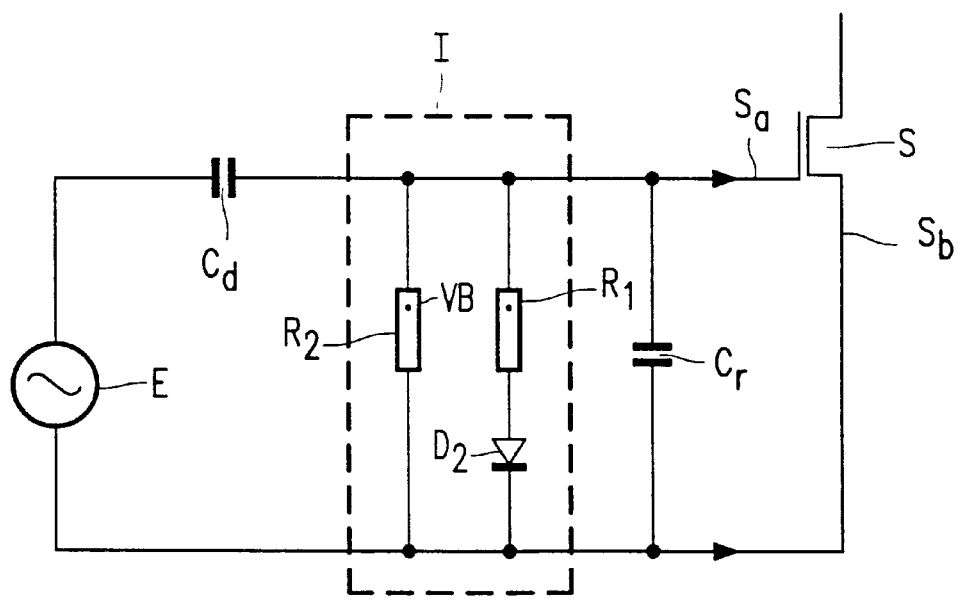
FIG. 4 shows a detail of a third embodiment.

A third embodiment of the circuit arrangement according to the invention is shown in FIG. 4. The means for generating a control signal are formed by an external signal source E in this embodiment. The means I comprise a series arrangement of a first resistive element R1 and a second unidirectional element D2 which is included between the control electrode Sa and the main electrode Sb of the switching element S. The second unidirectional element D2 is conducting when a voltage of the first polarity obtains between the control electrode Sa and the main electrode Sb. The means I further comprise voltage-limiting means VB for limiting voltages between the control electrode and the main electrode having a polarity opposed to the first polarity. The voltage-limiting means VB are formed by a branch comprising a second resistive element R2 between the control electrode Sa and the main electrode Sb. The control signal reaches the control electrode Sa via the first decoupling capacitive means Cd. The second unidirectional element D2 is conducting during the phase in which the voltage between the control electrode Sa and the main electrode Sb of the switching element S has the first polarity, and a current can flow through the first resistive element R1 and through the second resistive element R2. Current can flow only through the first resistive element R1 during the phase in which the voltage has the opposite polarity. As a result, a DC voltage component is superimposed on the control signal.

In a fourth embodiment shown in FIG. 5, the means I again comprise a series arrangement of a first resistive element R1 and a second unidirectional element D2 between the control electrode Sa and the main electrode Sb of the switching element S, with the second unidirectional element D2 passing a current when a voltage of the first polarity is present between the control electrode and the main electrode. The voltage-limiting means VB are formed here by a branch between the control electrode Sa and the main electrode Sb, which branch comprises not only a second resistive element R2 but also a DC voltage source which is to be connected to the input terminals K1, K2. The second resistive element R2 extends between the control electrode Sa and a conductor formed by the second input terminal K2 and having a potential of the first polarity. Electrodes E11, E12 of a lamp LA are connected to the output terminals K3, K4 of the load branch. Also in this embodiment, the primary winding Ta of the transformer forms inductive means.

Figure 5:
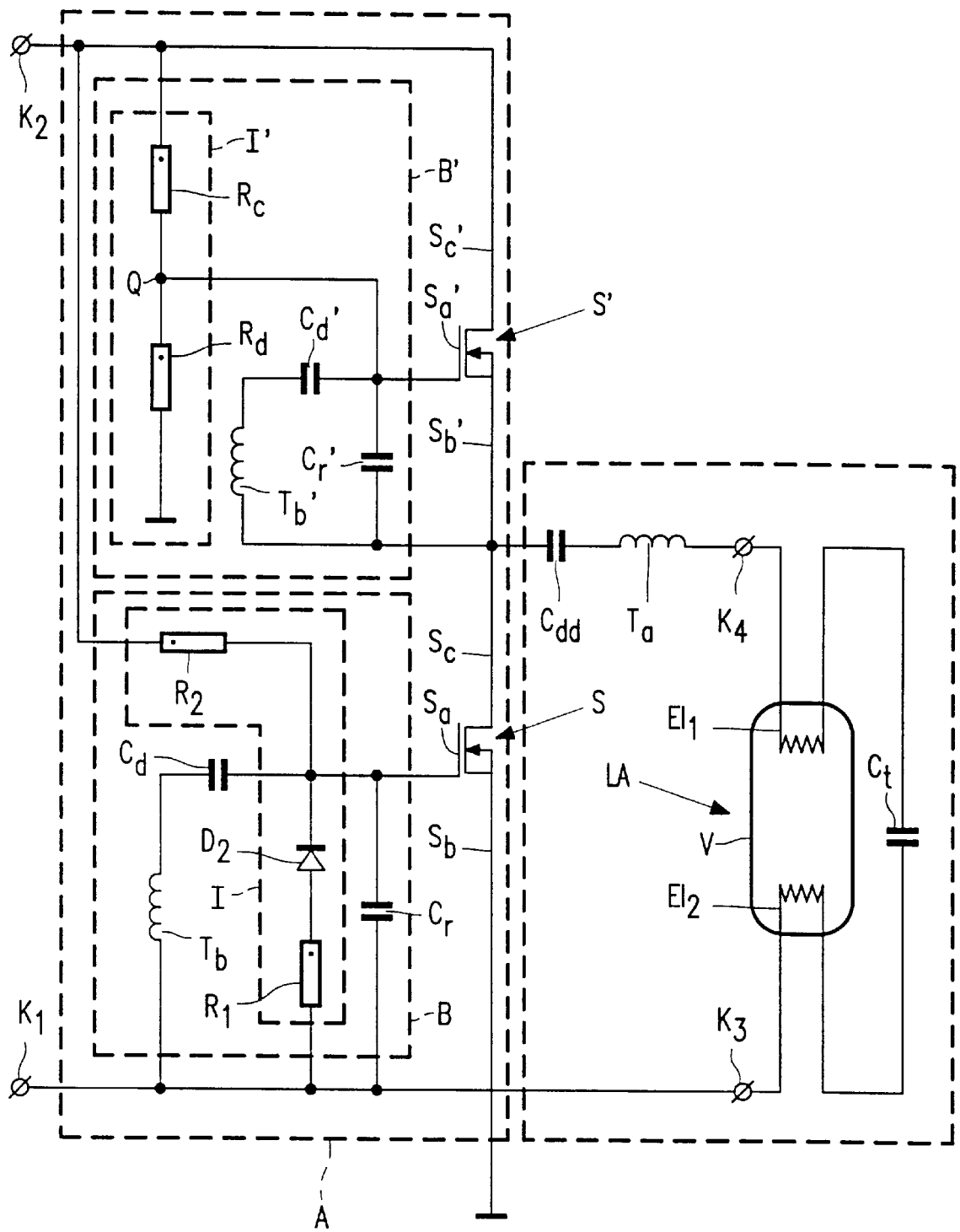
FIG. 5 shows a fourth embodiment.

The circuit arrangement shown in FIG. 5 operates as follows. When a voltage is applied to the input terminals K1, K2, a current will flow through the circuit R2, D2, R1, whereby a voltage of the first polarity arises between the control electrode Sa and the main electrode Sb of the switching element S. The resistance values of the resistive elements R1, R2 are chosen such that the value of said voltage is below the threshold value Vt of the switching element S. The switching element as a result still remains in a non-conducting state. A voltage of the first polarity and having a value higher than the threshold value Vt arises between the control electrode Sa' and the main electrode Sb' of the further switching element S' via the second voltage divider Ra, Rb, so that this further switching element starts conducting a current which runs through the primary winding Ta of the transformer. A voltage of the first polarity is generated thereby in the secondary winding Tb in the control circuit B of the switching element S, and a voltage of a polarity opposed to the first polarity is generated in the secondary winding Tb' of the control circuit B' of the further switching element S'. Since a DC voltage component of the first polarity is present already between the control electrode Sa and the main electrode Sb of the switching element S then, a small amplitude of the voltage originating from the secondary winding Tb will be sufficient for bringing the switching element S into a conducting state. The further switching element S' assumes a non-conducting state. As a result of this, the current through the load branch reverses its direction, and a voltage is generated again in the secondary windings Tb, Tb' of the transformer which brings the switching element S into a conducting and the further switching element S' into a non-conducting state again. The initiation of the oscillation causes an additional pulsatory direct current component to run through the circuit Tb, Cd, D2, R1 temporarily. A DC voltage component Vdc is built up thereby between the control electrode Sa and the main electrode Sb of the switching element S with a polarity opposed to the first polarity. The build-up of the DC voltage component stops when the latter has increased to the extent that the second unidirectional element D2 is conducting during a short time interval of each cycle only and the total charge conducted through the unidirectional element D2 during that time interval is in balance with the charge supplied by the current through R2 during the entire cycle.

Figure 6:
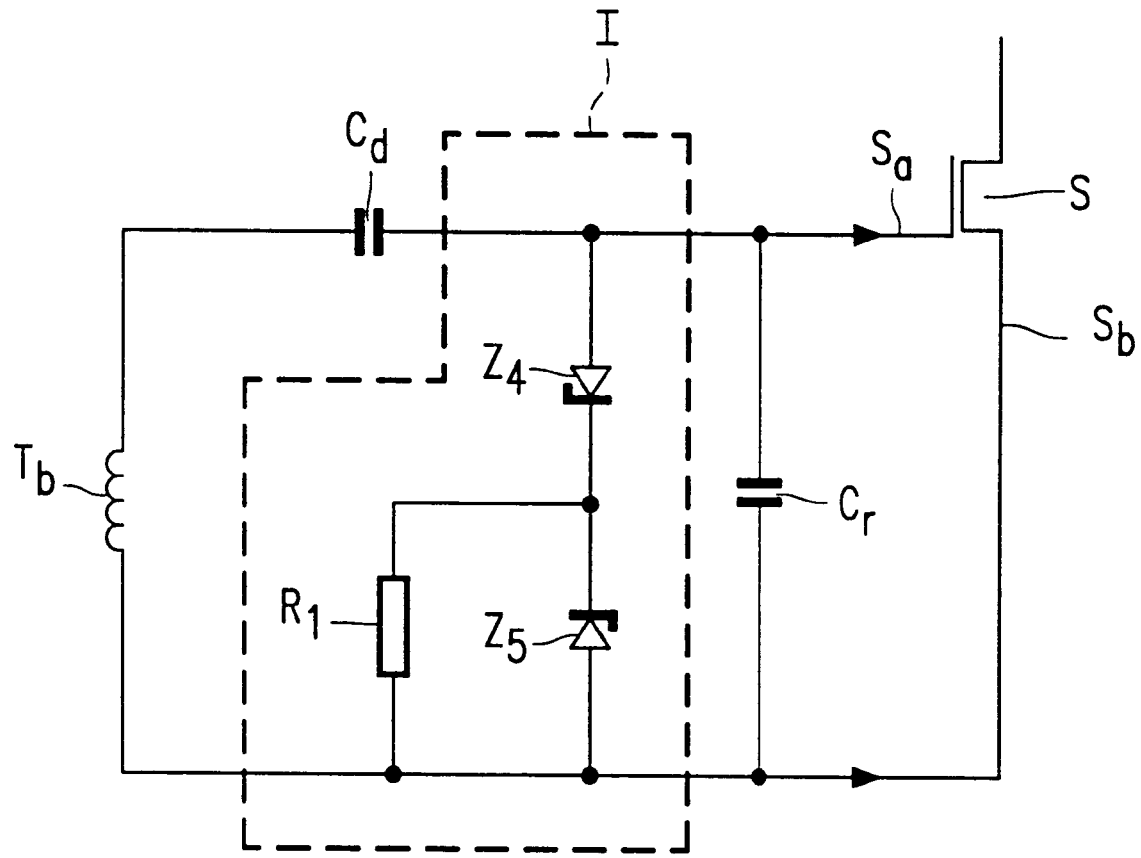
FIG. 6 shows a detail from a modified version of the fourth embodiment.

FIG. 6 shows a detail of a modified version of this embodiment. In this version, the control electrode Sa of the switching element S is protected by a pair of zener diodes Z4, Z5. Zener diode Z4 at the same time forms the second unidirectional element.

FIG. 7 shows a fifth embodiment of the circuit arrangement according to the invention. The DC/AC converter here is a class E converter whose switching element S is connected in series with inductive means L1 between the first and the second input terminal K1, K2, while the load branch E has a first end at a common junction point P of the switching element S and the inductive means L1 and a second end which is connected to the first input terminal K1. The load branch E is provided with inductive means which comprise. self-inductance L2 and primary winding Ta and with output terminals K3, K4 to which an electrodeless lamp LA having a coil Lla and a lamp vessel V is connected. A tank capacitor Ct is connected between the second output terminal K4 and the primary winding Ta of the transformer. The load branch E in addition has second decoupling capacitive means Cdd between the self-inductance L2 and the point P. The load branch E in addition comprises capacitive means Cz which shunt the switching element S so as to have the latter switch without a voltage. The control circuit S comprises means for generating a control signal, which means are formed by a secondary winding Tb of the transformer. The secondary winding Tb forms a resonant circuit together with capacitive means Cr.

The circuit arrangement shown in FIG. 7 operates as follows. When a DC voltage is applied to the output terminals K1, K2, a current will flow through the circuit R2, R1, D2, so that a voltage with the first polarity arises between the control electrode Sa and the main electrode Sb of the switching element S. The resistance values of the resistive elements R1, R2 are chosen such that the value of the voltage is just higher than the threshold value Vt of the switching element S, so that the latter will become conducting. As a result of this, the current direction through the primary winding Ta of the transformer is reversed. A voltage is generated thereby in the secondary winding Tb of the transformer which achieves that the voltage between the control electrode and the main electrode drops to below the threshold value. A DC voltage component is built up across the decoupling capacitive means Cd while the converter is oscillating.

We claim:

1. A circuit arrangement comprising a DC/AC converter for operating a discharge lamp (LA), which DC/AC converter is provided with:

input terminals (K1, K2) for connection of the DC/AC converter to a DC voltage source, a switching circuit (A) connected to the input terminals and provided with at least one switching element (S), which switching element has a control electrode (Sa) and a main electrode (Sb), which switching element has a control circuit (B) between the main electrode and the control electrode with a series arrangement of means (Tb) for generating a control signal for the switching element and of first decoupling capacitive means (Cd), and which switching element is conductive when a voltage is present between the control electrode and the main electrode with a first polarity and with a value which exceeds a threshold value (Vt), a load branch (E) comprising at least inductive means (Ta) and output terminals (K3, K4) for connection of the discharge lamp, which load branch is supplied via the switching circuit (A), characterized in that the control circuit (B) comprises means (I) for generating a DC voltage component (Vdc) between the control electrode (Sa) and the main electrode (Sb) with a polarity which is opposed to the first polarity for allowing the amplitude of the control signal to be increased to increase the switching speed of the switching element without increasing the duty cycle thereof.

2. A circuit arrangement comprising a DC/AC converter for operating a discharge lamp (LA), which DC/AC converter is provided with:

input terminals (K1, K2) for connection of the DC/AC converter to a DC voltage source, a switching circuit (A) connected to the input terminals and provided with at least one switching element (S), which switching element has a control electrode (Sa) and a main electrode (Sb), which switching element has a control circuit (B) between the main electrode and the control electrode with a series arrangement of means (Tb) for generating a control signal for the switching element and of first decoupling capacitive means (Cd), and which switching element is conductive when a voltage is present between the control electrode and the main electrode with a first polarity and with a value which exceeds a threshold value (Vt), a load branch (E) comprising at least inductive means (Ta) and output terminals (K3, K4) for connection of the discharge lamp, which load branch is supplied via the switching circuit (A), characterized in that the control circuit (B) comprises means (I) for generating a DC voltage component (Vdc) between the control electrode (Sa) and the main electrode (Sb) with a polarity which is opposed to the first polarity, and characterized in that the means (I) for generating a DC voltage comprise a series arrangement of a first breakdown element (Z1), a first unidirectional element (D1), and a buffering capacitive element (Cb), which series arrangement shunts the means (Tb) for generating a control signal, while the first breakdown element has a breakdown level in the conduction direction of the first unidirectional element, said means (I) in addition comprising a first voltage divider which shunts the buffering capacitive element and which has a first (Ra) and a second (Rb) resistive branch, while one (Ra) of the resistive branches of the first voltage divider forms a series circuit together with the first breakdown element and the first unidirectional element, which series circuit shunts the first decoupling capacitive means (Cd).

3. A circuit arrangement as claimed in claim 1, characterized in that the means (I) comprise breakdown means (Z2, Z3) which have a first breakdown level ($V_1$) at the first polarity and a second breakdown level ($V_2$) at the polarity opposed to the first, while the absolute value of the second breakdown level ($V_2$) is higher than that of the first breakdown level ($V_1$), and the amplitude ($A_2$) of the control signal is smaller than the absolute value of the first breakdown level ($V_1$).

4. A circuit arrangement as claimed in claim 3, characterized in that the amplitude ($A_2$) of the control signal is smaller than half the sum of the absolute values of the breakdown levels ($V_1$, $V_2$).

5. A circuit arrangement as claimed in claim 1, characterized in that the means (I) comprise a series arrangement of a first resistive element (R1) and a second unidirectional element (D2) between the control electrode (Sa) and the main electrode (Sb), which second unidirectional element is conducting at a voltage between the control electrode and the main electrode of the first polarity, while the means (I) in addition comprise voltage-limiting means (VB) for limiting voltages between the control electrode and the main electrode having a polarity opposed to the first polarity.

6. A circuit arrangement as claimed in claim 5, characterized in that the voltage-limiting means (VB) are formed by a branch comprising a second resistive element (R2) between the control electrode (Sa) and the main electrode (Sb).

7. A circuit arrangement as claimed in claim 5, characterized in that a second resistive element (R2) extends between the control electrode (Sa) and a conductor (K2) having a potential of the first polarity.

8. A circuit arrangement as claimed in claim 1, characterized in that the DC/AC converter is provided with a transformer of which a primary winding (Ta) is included in the load branch (E) and of which a secondary winding (Tb) forms means for generating a control signal for the switching element (S).

9. A circuit arrangement as claimed in claim 1, characterized in that the switching circuit (A) has a further switching element (S') with a control electrode (Sa') and a main electrode (Sb') in series with the switching element (S), and the further switching element (S') also has a control circuit (B') between its control electrode (Sa') and its main electrode (Sb') with a series arrangement of means (Tb') for generating a control signal and first decoupling capacitive means (Cd'), and in that the control electrode (Sa') of the further switching element is connected to a common junction point (Q) of a first and a second resistive branch (Rc, Rd) of a second voltage divider which is connected to the input terminals (K1, K2).

* * * * *